(12) United States Patent
Dellac et al.

(10) Patent No.: US 8,311,685 B2
(45) Date of Patent: Nov. 13, 2012

(54) METHOD OF DISTRIBUTING BRAKING WITHIN AT LEAST ONE GROUP OF BRAKES OF AN AIRCRAFT

(75) Inventors: Stephane Dellac, Tournefeuille (FR); Arnaud Jacquet, Clamart (FR); Gerard Leon Gissinger, Balschwiller (FR); Michel Basset, Heimsbrunn (FR); Yann Chamaillard, Le Bardon (FR); Jean-Pierre Garcia, Colomiers (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 1280 days.

(21) Appl. No.: 11/917,160

(22) PCT Filed: Mar. 13, 2007

(86) PCT No.: PCT/FR2007/000436
§ 371 (c)(1),
(2), (4) Date: Dec. 11, 2007

(87) PCT Pub. No.: WO2007/104861
PCT Pub. Date: Sep. 20, 2007

(65) Prior Publication Data
US 2008/0201025 A1 Aug. 21, 2008

(30) Foreign Application Priority Data
Mar. 13, 2006 (FR) .................................... 06 02181

(51) Int. Cl.
*G01C 23/00* (2006.01)
*G05D 1/00* (2006.01)

(52) U.S. Cl. .................... 701/3; 701/1; 701/15; 701/70; 701/71; 701/78

(58) Field of Classification Search .................... None
See application file for complete search history.

(56) References Cited

U.S. PATENT DOCUMENTS

| 7,506,941 | B2* | 3/2009 | Miller et al. | 303/191 |
|---|---|---|---|---|
| 2004/0262994 | A1* | 12/2004 | Baumann et al. | 303/155 |
| 2006/0191751 | A1* | 8/2006 | Miller et al. | 188/1.11 L |
| 2007/0132311 | A1* | 6/2007 | Giazotto | 303/126 |
| 2009/0095576 | A1* | 4/2009 | Miller et al. | 188/1.11 E |
| 2010/0286881 | A1* | 11/2010 | Cahill | 701/70 |

FOREIGN PATENT DOCUMENTS

| EP | 0 443 213 A2 | 8/1991 |
|---|---|---|
| EP | 1 588 912 A1 | 10/2005 |
| GB | 1 585 321 A | 2/1981 |

\* cited by examiner

*Primary Examiner* — Ian Jen
(74) *Attorney, Agent, or Firm* — Sughrue Mion, PLLC

(57) ABSTRACT

The invention provides a method of managing the braking of an aircraft having a plurality of brakes comprising friction elements, the method comprising the following steps for at least one group of brakes:
estimating an energy level ($\Box E$) to be dissipated by the brakes of the group; and
estimating individual braking setpoints ($F_i$) for each of the brakes of the group so that the individual braking setpoints make it possible, at least under normal operating conditions of the brakes, to implement braking that dissipates said energy level, the individual braking setpoints also being determined so as to satisfy at least one other given operating objective.

5 Claims, 2 Drawing Sheets

METHOD OF DISTRIBUTING BRAKING WITHIN AT LEAST ONE GROUP OF BRAKES OF AN AIRCRAFT

The invention relates to a method of distributing braking within at least one group of brakes of an aircraft.

BACKGROUND OF THE INVENTION

Aircraft of a certain size are generally fitted with a braking computer which, in order to achieve a given amount of deceleration, generates a braking force objective in response either to the pilot pressing on the brake pedals, or in response to the pilot setting a determined level of deceleration (the "autobrake" function). In practice, this braking force objective is implemented by sending braking setpoints to power driver members associated with the brakes, the setpoints being identical for all of the brakes and being such that the sum of the braking forces developed by the brakes in response thereto achieves the braking force objective. This overall braking force is applied by the braking computer for a period of time that is sufficiently long to enable the brakes to dissipate in friction the energy that is needed for achieving the required deceleration of the aircraft.

While taxiing on the ground, i.e. while the aircraft is moving at low speed on an airport, methods are known for distributing braking in which braking is applied using only a fraction of the brakes. Then, next time the brakes are applied, braking is performed with the complementary fraction of the brakes. The purpose of that method is to reduce overall wear of the brake friction elements.

Nevertheless, that type of distribution presents certain drawbacks. The subdivision of the brakes into two complementary brake fractions is determined a priori, and in general, each fraction comprises half of the brakes selected in such a manner that braking with identical braking forces on each active brake gives rise to braking that is symmetrical. Thus, although the brakes suffer less wear overall, it can happen that the friction elements of one of the brakes heat up faster than in neighboring brakes and nevertheless reach a temperature range in which friction element wear is faster.

Anti-slip protection schemes are also known that consist in momentarily reducing the braking force of a brake if the corresponding wheel begins to slip. These corrections are applied to one wheel or another without any overall distribution strategy being implemented. Momentarily, the total braking force can drop below the braking objective.

Document GB 1 585 321 discloses a method of equalizing the energy dissipated between two brakes by calculating, for each brake, a rate of energy dissipation by multiplying the torque generated by the brake by the criterion of wheel rotation, and then integrating that rate. That method does no more than distribute, a posteriori, the braking forces between the two brakes on the basis of the amount of energy that has been dissipated by each of those brakes.

OBJECT OF THE INVENTION

An object of the invention is to provide a method of distribution that enables the use of brakes to be optimized.

BRIEF SUMMARY OF THE INVENTION

To this end, the invention provides a method of managing the braking of an aircraft having a plurality of brakes comprising friction elements, the method comprising the following steps for at least one group of brakes:

estimating an energy level to be dissipated by the brakes of the group; and estimating individual braking setpoints for each of the brakes of the group so that the individual braking setpoints make it possible, at least under normal operating conditions of the brakes, to implement braking that dissipates said energy level, the individual braking setpoints also being determined so as to satisfy at least one other given operating objective.

Thus, by specifying in advance the level of energy to be dissipated by the group of brakes before braking is performed, it becomes possible to satisfy some other operating criterion that takes account of the energy level to be dissipated, while still dissipating the energy level that is required of the group.

For example, if within the group one of the brakes becomes too hot, it is then possible to increase the braking force delivered by the other brakes in the group so as to off-load the brake that is too hot.

Such a distribution of braking between the brakes within a group is not set a priori, but can vary on each application of the brakes in order to satisfy the operating criterion that has been retained. Thus, unlike known distributions, it is not possible to determine in advance how braking force will be distributed.

Preferably, the other operating objective comprises preserving components of the aircraft that are stressed during braking by the brakes of the group.

It is then appropriate to distribute braking in such a manner as to preserve the stressed components, for example in order to increase their lifetime.

In various particular implementations, the other operating objective comprises:

minimizing wear of the friction elements of the brakes of the group; or minimizing wear of the tires associated with the brakes of the group.

For an aircraft that is fitted with electro-mechanical brakes having electromechanical braking actuators, another operating objective may comprise:

minimizing the number of times the brakes in the group are actuated; or minimizing the amplitude of the forces applied by the actuators.

BRIEF DESCRIPTION OF THE DRAWINGS

The invention can be better understood in the light of the following description with reference to the figures of the accompanying drawings, in which.

DETAILED DESCRIPTION OF THE INVENTION

Figure 1:
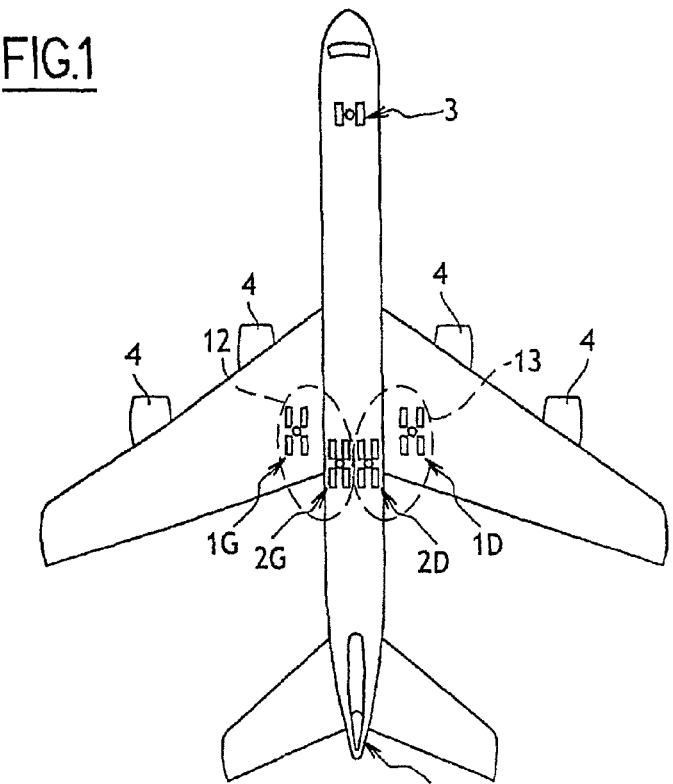
FIG. 1 is a diagrammatic view of an aircraft having four main undercarriages with braked wheels.

The invention is illustrated herein with reference to an aircraft of the kind shown in FIG. 1, having two main wing undercarriages 1G and 1D, two main fuselage undercarriages 2G and 2D, and a nose undercarriage 3 with steerable wheels. Each of the main undercarriages 1G, 1D, 2G, 2D has four wheels equipped with respective brakes. The aircraft is also fitted with engines 4, and with a rudder 5.

Figure 2:
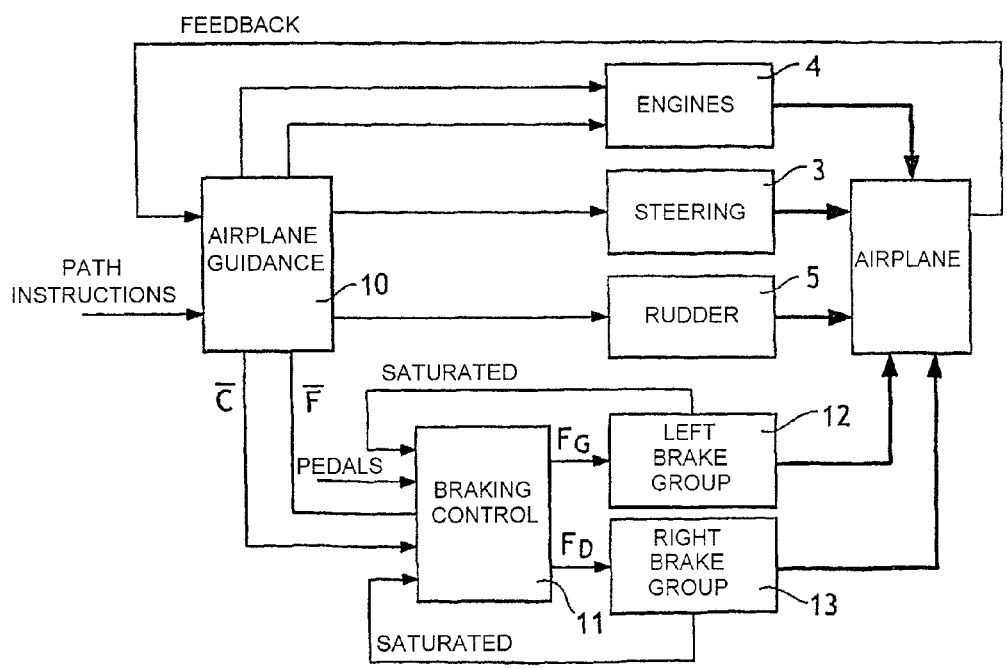
FIG. 2 is a block diagram of a ground-guidance architecture for the FIG. 1 aircraft in a particular implementation of the invention.

The invention applies to a ground-guidance architecture for the aircraft shown in FIG. 2 that includes an aircraft guide module 10. The guide module 10 receives as input a path setpoint (which may, where appropriate be rectilinear) and it controls all of the members that can have an influence on the path followed by the aircraft on the ground, i.e. the engines 4, the steering of the wheels of the nose undercarriage 3, the rudder 5, and naturally the brakes of the main undercarriages.

The guide module 10 generates orders for the engines 4, for the rudder 5, and for controlling the steering of the wheels of the nose undercarriage 3, and by taking the difference between the path setpoint and the effects expected of the actions carried out by the above-mentioned members in response to said orders it deduces a braking objective $\overline{F}$ and a steering torque objective $\overline{C}$ to be achieved by the brakes.

The path setpoint may present various forms:
in a pure braking mode, e.g. on landing, the path setpoint consists in specifying to the guide module 10 at least one given deceleration rate and a zero turning rate; and
in a ground taxiing mode, e.g. between the runway and the terminal, the path setpoint consists in specifying to the guide module 10 at least one turning rate that varies at all times to follow a determined path.

The braking objective $\overline{F}$ determined from the path setpoint, itself represents a setpoint, i.e. how a braking force that the brakes are to develop should vary over time in order to cause the aircraft to follow the path with a given movement (position, speed, acceleration). In practice, the braking force objective represents one or more applications of the brakes of determined duration and intensity. Each application of the brakes can be associated with a total amount of energy to be dissipated by all of the brakes of the aircraft, obtained by integrating the braking force objective over time.

Similarly, the steering torque objective $\overline{C}$ also represents a setpoint, i.e. the variations over time in the steering torque that the brakes need to develop for the aircraft to follow the path in application of a given movement (position, speed, acceleration). Steering torque may be necessary, for example, in order to brake the aircraft while turning.

The brakes are controlled by a braking control module 11 that receives from the guide module 10 both the braking force objective $\overline{F}$ and the steering torque objective $\overline{C}$ to be implemented by the brakes.

Starting from the braking force objective $\overline{F}$ and the steering torque objective $\overline{C}$, the braking control module 11 generates two braking levels Fg and Fd destined respectively:
for a left brake group 12 grouping together the brakes carried by the left wing main undercarriage 1G and the left fuselage main undercarriage 2G; and
a right brake group 13 grouping together the brakes carried by the right wing main undercarriage 1D and the right fuselage main undercarriage 2D.

Dashed lines in FIG. 1 show how the left and right groups 12 and 13 are made up. It can be seen that the left and right groups 12 and 13 are symmetrical.

According to the invention, the braking levels Fg and Fd are determined so that their sum is equal to the braking objective $\overline{F}$ and their steering effect on the aircraft is equal to the steering torque objective $\overline{C}$.

In practice, in such a configuration, the steering torque objective $\overline{C}$ can be specified by a difference between the force to be developed by one of the groups and the force to be developed by the other group.

Nevertheless, satisfying the braking objective $\overline{F}$ and the steering torque objective $\overline{C}$ assumes that the brakes have sufficient capacity to satisfy both objectives simultaneously, as is indeed true under the normal operating conditions of the brakes.

Nevertheless, under certain circumstances (wet runway, faulty brakes), it can happen that one or more of the brakes can generate only a limited braking force, preventing the braking objective $\overline{F}$ or the steering torque objective $\overline{C}$ being achieved. Under such circumstances, a saturation signal is sent by the group in question to the braking control module 11, which takes this saturation into account in order to generate braking levels Fg and Fd that come as close as possible to the required objectives $\overline{F}$, $\overline{C}$, given the braking capacity that is available.

In a particular implementation, the braking control module 11 is programmed to organize the objectives hierarchically, for example it may give priority to achieving the braking objective $\overline{F}$ over achieving the steering torque objective $\overline{C}$. Under such circumstances, the braking control module 11 generates braking levels Fg, Fd that are adapted to satisfy the braking objective $\overline{F}$, but having an effect on steering torque that merely comes as close as possible to the steering objective $\overline{C}$, given the capacities of the brakes. More generally, braking levels Fg, Fd are sought that maximize a simultaneous satisfaction level for both objectives $\overline{F}$ and $\overline{C}$ while taking account of any limitations of one or more brakes.

In a variant, the pilot might be given an option to give greater weight to one or the other of the objectives $\overline{F}$ and $\overline{C}$.

While braking is being applied in compliance with the braking levels Fg and Fd as determined in this way, the left brake group 12 and the right brake group 13 act mechanically on the path followed by the aircraft as represented by bold arrows, as do the engines 4, the steerable wheels of the nose undercarriage 3, and the rudder 5, with the actions of all these members having an influence on the path followed by the aircraft.

Measurements of magnitudes that are representative of the path, such as speed, longitudinal acceleration, or angular acceleration, are then delivered to the guide module 10 in order to form a feedback loop.

Figure 3:
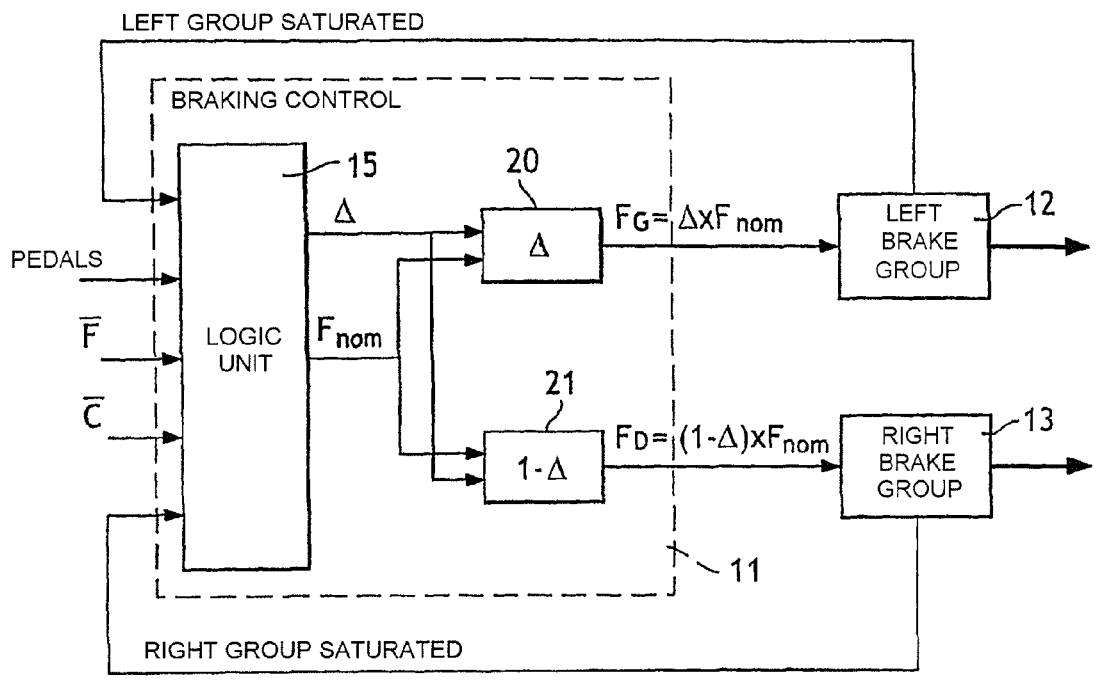
FIG. 3 is a view showing a detail of FIG. 2, illustrating how braking is controlled.

The braking control module 11 is described below in greater detail with reference to FIG. 3.

The braking control module 11 has a logic unit 15 programmed to respond to the required braking objective $\overline{F}$ and steering torque objective $\overline{C}$, to generate a nominal force setpoint Fnom and a left/right distribution setpoint Δ by means of which a first modulator 20 generates the braking level Fg for the left brake group 12 and a second modulator 21 generates the braking level Fd for the right brake group. In practice, the braking level Fg is obtained by obtaining the product Δ×Fnom, and the braking level Fd is obtained by obtaining the product (1−Δ)×Fnom. The logic unit 15 is programmed so that in the event of one or other of the brake groups saturating, it modulates the nominal force setpoint Fnom and the distribution setpoint Δ so as to come as close as possible to the objectives $\overline{F}$ and $\overline{C}$, given the available braking capacity.

Thus, by the distribution performed in accordance with the invention, the brakes enable a braking force and a steering torque to be exerted on the aircraft. It should be observed that the distribution implemented in this way is not frozen but varies over time.

Knowing the braking level of a group makes it possible to estimate the energy that is to be dissipated by the brakes of that group, by integrating its braking level over time.

Figure 4:
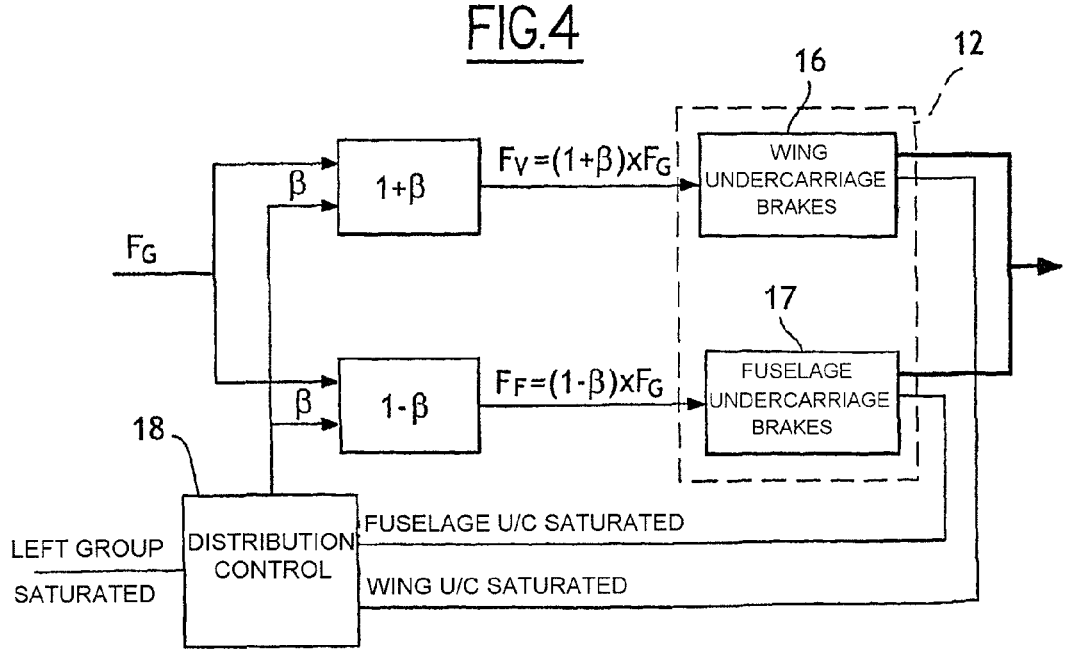
FIG. 4 is a block diagram of a distribution within a single group, that is adaptable to the control illustrated by FIG. 3.

The principle of grouping brakes in accordance with the invention can be taken to a higher level by distinguishing subgroups within a group. For example, in the left group, and as shown in FIG. 4, it is possible to distinguish a first subgroup 16 made up of the brakes fitted to the left wing main undercarriage 1G, and a second subgroup 17 made up of the brakes fitted to the left fuselage main undercarriage 2G.

The braking level Fg is subdivided into two braking sublevels Fv and Ff for those two subgroups 16 and 17 respectively by means of a distribution control module 18 that generates a distribution coefficient β which is used to obtain the products $$Fv=(1+\beta)\times Fg$$

and $$Ff=(1-\beta)\times Fg.$$

By construction, the sum of the braking sublevels Fv and Fb is equal to the braking level Fg. The distribution control module 18 takes account of the saturation signals coming respectively from the brakes of the first subgroup 16 and from the brakes of the second subgroup 17 in order to calculate the distribution coefficient β. Thus, if the brakes of one of the subgroups saturate, it is possible to divert the braking force onto the brakes of the other subgroup. If this diversion does not suffice for achieving the left braking setpoint Fg, the distribution control module 18 generates a saturation signal for the left brake group 12.

In order to achieve the level of braking intended for one of the brake groups (or subgroups), it is appropriate for all of the brakes of the group to generate individual braking forces such that the resultant of the individual braking forces developed by each of the brakes reaches the required braking level.

In a first procedure, it is ensured that the individual braking forces are identical for all of the brakes of the group. This is the simplest procedure.

In a second procedure that is particularly advantageous, the various individual braking forces are determined so as to satisfy a given operating criterion, while complying with a required braking level, and naturally while taking account of the available braking capacity.

In a first implementation, the operating criterion retained is minimizing the wear suffered by the friction elements of the brakes in the group. It is known that carbon friction elements present a wear rate that depends on the temperature of the friction elements. If $\Delta T_k$ is the increase in the temperature of brake k during the forthcoming braking, then the wear on brake k is given by:

$$U_k = \int_{T_k}^{T_k+\Delta T_k} \tau(T)dT$$

where τ is the wear rate that depends in particular on temperature.

In order to calculate the rise in temperature $\Delta T_k$ of the brake k, a thermal model of the brake is used that calculates the rise in temperature $\Delta T_k$ as a function of the energy $\Delta E_k$ dissipated by the brake. Ignoring the natural cooling of the brake (which is valid for braking durations that are short and brake temperatures that are low), it is possible to associate the increase in temperature $\Delta T_k$ of the brake k with the energy $\Delta E_k$ to be dissipated by the brake during the forthcoming braking by using the following model:

$$\Delta E_k = \int_{T_k}^{T_k+\Delta T_k} M_k C_p dT_k$$

where $M_k$ is the mass of the friction elements of the brake k, which is assumed to be constant during the braking, and $C_p$ is the thermal capacity of the material constituting the friction elements of the brake k.

The total energy ΔE to be dissipated by the brakes of the group is naturally equal to the sum of the amounts of energy dissipated by each of the brakes. The total energy to be dissipated by the brakes is given by integrating over time the braking force objective of the group, as mentioned above.

Thus, minimizing wear amounts to seeking for each of the brakes of the group, an amount of energy $\Delta E_k$ to be dissipated that minimize the quantity:

$$\sum_k U_k$$

under the constraint:

$$\Delta E = \sum_k \Delta E_k$$

From the amounts of energy $\Delta E_k$ to be dissipated by each of the brakes in the group, individual setpoints are deduced for the braking force $F_i$ to be developed by each of the brakes.

Wear minimization can be obtained by any known optimization technique. In a preferred implementation of the invention, a certain number of arbitrary distributions of energy between the brakes of the group are retained. In practice, each distribution is represented by a list of coefficients (as many coefficients as there are brakes in the group) with the sum of the coefficients in each list being equal to 1. For example, if the group has two brakes, then the following distributions could be considered:

$R^1=\{1; 0\}$, $R^2=\{0.7; 0.3\}$, $R^3=\{0.5; 0.5\}$, $R^4=\{0.3; 0.7\}$, and $R^5=\{0; 1\}$ Minimization consists in calculating for each arbitrary distribution $R^i$ the corresponding energies $\Delta E_k^i$ for each of the brakes, and then the wear $U_k^i$ of each of the brakes produced by dissipating the corresponding energy. The total wear:

$$U^i = \sum_k U_k^i$$

is the sum of the amounts of wear calculated in this way. The arbitrary distribution $R^i$ that gives the smallest total wear $U^i$ is then retained.

Wear minimization as described above thus applies to all of the brakes in a given group. It is possible to apply this operating criterion to each of the groups of brakes so as to minimize friction element wear on a group-by-group basis. Nevertheless, as is well known, minimizing wear on a group-by-group basis can lead to a result that is not optimum from the point of view of all of the brakes of the aircraft.

It is thus advantageous, in accordance with the invention, for the wear minimization operating criterion to be generalized so as to apply to all of the brakes of the aircraft simultaneously, while still complying, for each group, with the required braking force level. A search is thus made for the distribution over all of the brakes that minimizes overall wear, while ensuring that each group complies with the required braking force level.

Also advantageously, the wear minimization operating criterion is generalized in accordance with the invention not only for all of the brakes for a given application of the brakes, but also for all of the applications of the brakes that are to be expected along the path. To do this, it is appropriate in advance to determine the expected braking operations and thus to determine the amount of energy that will be dissipated by each of the groups of brakes, which makes it necessary to know the entire path that the aircraft is likely to follow on the airport.

This knowledge can be obtained either by storing the possible path(s) on the airport in a memory, or by a statistical study applied to a typical path for such and such an airport, specifying the mean number of applications of the brakes and the mean intensity thereof.

Over the expected path, the movement (position, speed, acceleration) of the aircraft is determined along said path, and the braking and steering torque objectives and the energy to be dissipated by the brakes are deduced therefrom.

The invention is not limited to the above description, but on the contrary covers any variant coming within the ambit defined by the claims.

In particular, the distribution of braking in accordance with the invention remains compatible with implementing anti-slip protection for each of the braked wheels.

Although it is stated that a braking force objective $\overline{F}$ and a steering torque objective $\overline{C}$ are established, the invention also covers the situation where only one of those objectives is established, for example the braking force objective $\overline{F}$. Under those circumstances, it suffices to set the steering torque objective $\overline{C}$ arbitrarily to zero.

Although it is stated that the operating criterion retained for applying braking is minimizing the wear of the friction elements, other operating criteria could be retained. For example, it is possible to select as the operating criterion making a search for the distribution that leads to braking force being applied as smoothly as possible so as to improve passenger comfort or so as to preserve the components of the aircraft that are subjected directly to braking force (undercarriages, the undercarriage to airframe connections, the associated tires, . . . ). For the brakes, it is also possible to minimize the number of times the brakes are actuated so as to increase brake lifetime, or to minimize the amplitudes of the forces to be applied.

Finally, although the brakes are described as being subdivided into a left group and a right group, this distribution is not limiting, and the brakes could be distributed in some other way, for example:
 a left group made up of the left wing undercarriage brakes;
 a right group made up of the right wing undercarriage brakes; and
 a central group made up of the fuselage undercarriage brakes.

The distribution of brakes within groups is not necessarily determined once and for all, and it may be varied within the ambit of the invention.

Naturally, the invention does not apply solely to the particular configuration shown herein comprising two main wing undercarriages and two main fuselage undercarriages, but it applies to any configuration of undercarriages having brakes.

The invention also naturally applies equally well regardless of whether the brakes are actuated hydraulically, electro-mechanically, or using any other technology.

What is claimed is:

1. A method of managing a braking of an aircraft having a plurality of groups of brakes, each brake of a group of brakes comprising friction elements, the method comprising the following steps for each one of the groups (12, 13) of brakes:
    estimating, by a braking computer, an energy level (DeltaE) to be dissipated by the brakes of the group during the forthcoming braking; and
    estimating, by the braking computer, individual braking setpoints ($F_i$) for each of the brakes of the group so that the individual braking setpoints make it possible, at least under normal operating conditions of the brakes, to implement braking that dissipates said energy level, the individual braking setpoints also being determined so as to satisfy at least one other given operating objective.

2. A method according to claim 1, in which the other operating objective comprises preserving components of the aircraft, comprising at least one of brakes or actuators that are stressed during braking by the brakes of the group.

3. A method according to claim 2, in which the other operating objective comprises minimizing wear (U) of the friction elements of the brakes of the group.

4. A method according to claim 2, applied to an aircraft fitted with electromechanical brakes having electro-mechanical braking actuators, in which the other operating objective comprises minimizing a number of times the brakes in the group are actuated.

5. A method according to claim 1, in which the brakes are distributed in the group of brakes in such a way that this distribution of the brakes in the groups of brakes is variable.

* * * * *